Patented Apr. 25, 1950

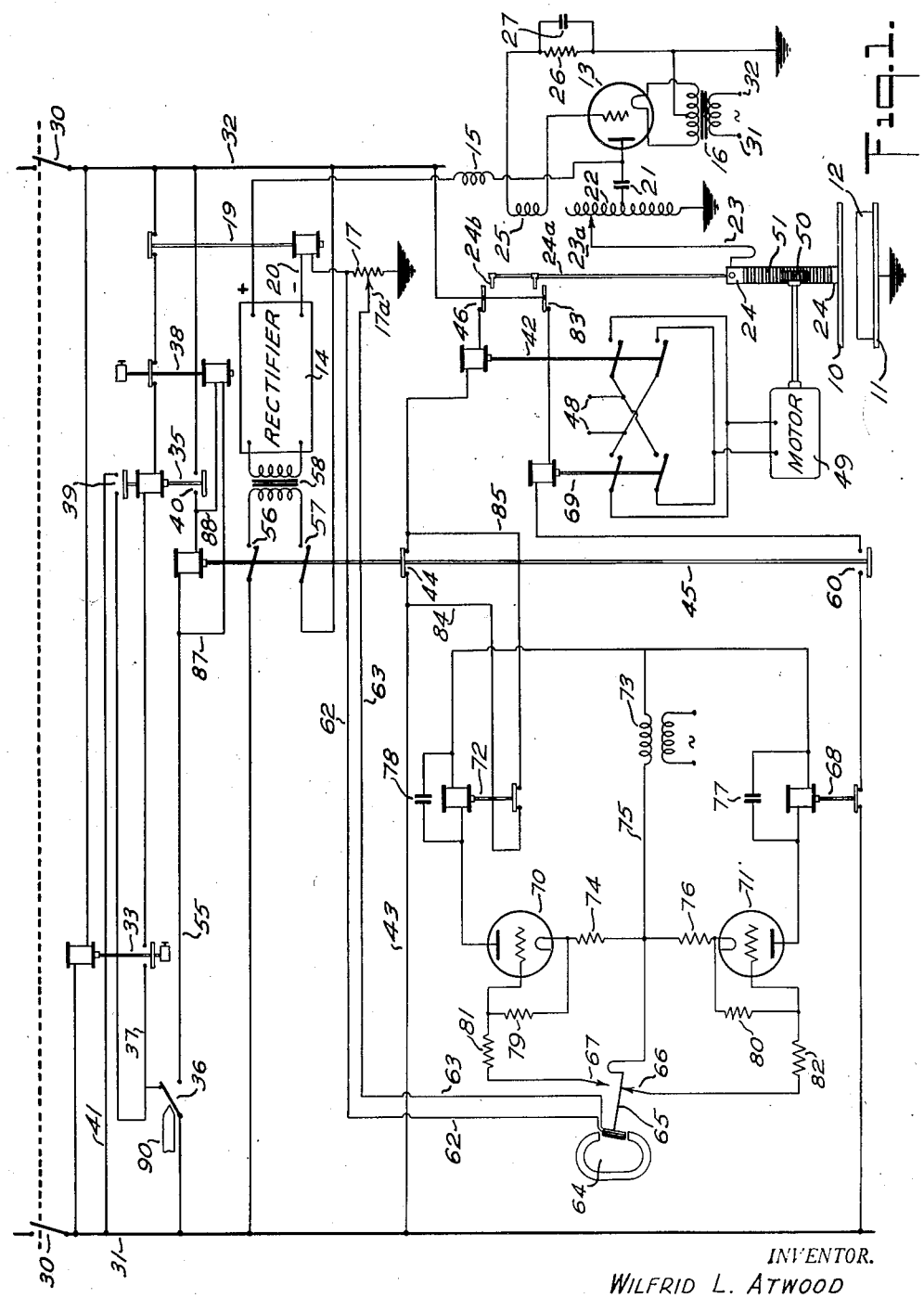

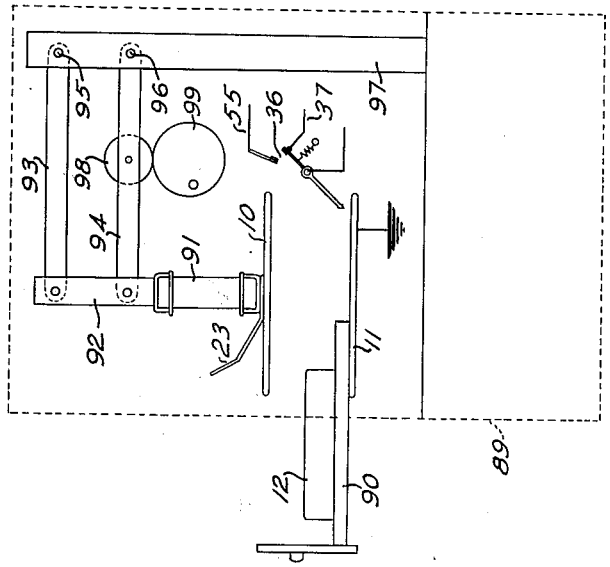

2,504,955

UNITED STATES PATENT OFFICE 2,504,955

HIGH-FREQUENCY TREATING SYSTEM FOR DIELECTRIC MATERIALS

Wilfrid L. Atwood, Jefferson County, Ky., assignor to The Girdler Corporation, Louisville, Ky., a corporation of Delaware Application June 1, 1945, Serial No. 597,048

3 Claims. (Cl. 219—47)

This invention relates to high-frequency treating systems for dielectric materials and has for an object the provision of means for automatically controlling the load or the amount of electrical power or energy applied to the dielectric material undergoing treatment.

It has heretofore been recognized that dielectric materials change their characteristics with increasing temperature. For many materials the power factor and dielectric constant of such materials increase as the temperature rises. It has, therefore, been suggested that a variable inductor be included in the load circuit to maintain it at a frequency resonant with the frequency from the high-frequency generator. The adjustment of the variable inductor would be in a direction to compensate for the change in the dielectric constant, or capacitance, due to the rising temperature of the dielectric material. Also, it has been suggested to include a variable coupling between the generator and the load circuit, which coupling may be adjusted to compensate for changes in power factor resulting from changes in temperature of the dielectric material. The disadvantage with systems of this type is that two variables are changed, in that there is a change in the load and a change in the resonant frequency.

In the application filed concurrently herewith, Serial Number 597,047, by Paul D. Zottu, a co-worker of mine, there is disclosed a system in which the dielectric load is directly included in the tank circuit as capacity together with a grid circuit energized directly from the tank circuit. My invention is particularly applicable to high-frequency generating systems of this type, though certain aspects thereof may be applied to other electrical systems.

In carrying out the present invention in one form thereof, there is provided a high-frequency generator or oscillator having an output circuit which forms the tank circuit of the oscillator. The capacitance between the electrodes to which the high-frequency electrical energy is applied is automatically adjusted to maintain a predetermined load on the high-frequency oscillator or generator. More specifically, the spacing of the electrodes is adjusted so as to maintain at a predetermined value the anode or plate current of the oscillator and preferably to mtaintain it at substantially the normal rated load thereof. This is accomplished by means of a device sensitive to small changes in anode current and which through electric valve means controls the operation of a motor to adjust the spacing of the electrodes in the correct direction to maintain the anode current at its predetermined value.

For a more complete understanding of the invention and for further objects and advantages thereof, reference should now be had to the following description taken in conjunction with the accompanying drawings, in which:

Fig. 1 is a wiring diagram which schematically illustrates a system embodying the inventon;

Fig. 2 diagrammatically illustrates one suitable mechanism for adjustably supporting one of the electrodes; and Fig. 3 diagrammatically illustrates a system in which electric valves of a different type have been utilized.

Referring now to Fig. 1, there has been illustrated a pair of electrodes 10 and 11, between which there is disposed dielectric material 12 to be treated or heated by the application thereto of high-frequency electrical energy. High-frequency electrical energy is generated by an oscillator which includes electric valve means 13 having an input circuit which may be traced from a rectifier 14 by way of a choke coil 15, the anode of the valve means 13, thence to the cathode and from the mid-tap of the secondary winding of a filament transformer 16 to ground. The return circuit is from ground by way of variable resistor 17, an overload relay 19, and by conductor 20 to the other side of the rectifier 14.

The electrical generator or oscillator includes a tank circuit connected by way of the blocking capacitor 21 to the anode of the valve means 13 and which comprises an inductor 22, conductor 23, a movable support or post 24 which carries the electrode 10, the capacitance between the electrodes 10 and 11. The electrode 11 is connected by the ground connection to the other side of the inductor 22. The generator includes a grid circuit which by means of the inductor 25 is inductively coupled to the inductor 22. This grid circuit includes the grid in the valve means 13, and in this grid circuit there is included a resistor 26 shunted by a capacitor 27 to form a grid-biasing means. The grid circuit is connected to the mid-tap of the secondary of the filament transformer 16.

It will be understood that upon energization of the filament transformer 16 from a suitable source of supply indicated at 31 and 32, and upon energization of the rectifier 14, the generator will supply electrical energy to the dielectric material 12 with a frequency determined by the value of the inductance of inductor 22 and the value of the capacitance between electrodes 10 and 11. In general, these values will be selected so that the resonant frequency of this tank circuit will ordinarily lie in the range of from 1 megacycle to 30 or more megacycles, though frequencies of other ranges may be utilized. Since the grid circuit is energized directly from the tank circuit which includes the load, or the dielectric material 12, it will be understood that the frequency of the energy supplied to the grid circuit will vary in accordance with any change in the capacitance between the electrodes 10 and 11. A change in the capacitance of the tank circuit produces a change in the resonant frequency thereof. The excitation of the grid circuit likewise changes. There is no detuning of the one circuit with respect to the other, with a consequent reduction in load. The load on the oscillator will, therefore, be largely dependent upon the voltage applied to the load and this voltage varies with the spacing of the electrodes. In consequence, the load may be regulated directly by changing the spacing between the electrodes 10 and 11, which, of course, changes the capacitance of the output tank circuit. Accordingly, if this capacitance is adjusted in proper manner, the generator may be operated at any desired load, or at the optimum load for the valve means 13.

In accordance with the invention, automatic control is accomplished by adjusting the spacing of the electrodes in accordance with changes in value of the anode or plate current. The manner in which this is accomplished will be fully explained, but before doing so, reference will first be had to the system as a whole, which system includes certain desirable features utilized for the general protection of circuit elements.

In starting up the system, the main line switch or circuit breaker 30 is closed to apply alternating current to supply lines 31 and 32. It will be observed that the operating coil of a relay 33 is immediately energized. This relay may be of any conventional design, of which there are a number on the market, having the characteristic of closing its contacts a predetermined time interval after energization of the operating coil. As indicated by the reference characters applied to filament transformer 16, as soon as the circuit breaker 30 has been closed, the primary winding of the filament transformer 16 is energized to initiate heating of the filament or cathode of the valve means 13. After a time interval adequate for the cathode to be heated to a desired operating temperature, the relay 33 closes its contacts to complete an energizing circuit for a relay 35. This circuit may be traced from supply line 31 by way of a slide-actuated switch 36, the conductor 37, closed contacts of the relay 33, the operating coil of relay 35, the closed contacts of a timing relay 38 and by the normally closed contacts of the overload relay 19 to the other supply line 32. Accordingly, the relay 35 is energized to close its contacts 39 and 40. The closure of the contact 39 completes a holding circuit for the operating coil of relay 35 which may be traced by way of conductor 41, contacts 39, conductor 37, contacts of relay 33 and thence through the remaining part of the circuit traced above.

It may be further observed that as soon as the circuit breaker 30 was closed, an energizing circuit was completed for the operating coil of a contactor 42 which may be traced from the supply line 31 by way of conductor 43, contacts 44 of a relay 45, the operating coil of contactor 42, and by the contacts of a limit switch 46 to the other supply line 32. In consequence, the contactor 42 closes its contacts to energize from a suitable source of supply, such as indicated at 48, a motor 49 for operation thereof in a direction to raise the electrode 10 to its uppermost position. As shown, the motor 49 drives a gear 50 which meshes with a rack gear 51 carried by the post 24 for the raising and lowering of electrode 10. As the electrode 10 and the post 24 move upwardly, an insulated extension 24a has an inwardly extending projection 24b which operates the contacts 46 of the limit switch to interrupt the circuit traced therethrough. Thus, the motor 49 is de-energized as soon as the electrode 10 has been moved to its uppermost position. The electrode 10 is retained in that position, since the motor 49 must be energized for movement of the electrode 10 in either direction. With the electrode 10 in its uppermost position, a minimum of capacitance is included in the output or tank circuit of the high-frequency generator.

It has been found convenient to insert dielectric materials between the plates 10 and 11 by utilizing a slide or drawer which, when disposed symmetrically between the electrodes 10 and 11, closes the slide-actuated switch 36. Hence, it will now be assumed that the slide has been moved to its operating position so that the switch 36 moves from the illustrated position to one in which a circuit is completed by way of conductor 55 for the operating coil of the relay 45. This circuit may be traced from the other side of such operating coil to the other side 32 of the line by way of the contacts 40 of relay 35. The relay or contactor 45 thereupon closes to energize through its contacts 56 and 57 the transformer 58 which supplies the rectifier 14 and the anode circuit of the valve means 13. At the same time, it opens its contacts 44 and closes its contacts 60. Inasmuch as the rectifier is now energized to apply plate or anode voltage to the valve means 13, oscillations are immediately initiated and high-frequency electrical energy is supplied to the electrodes 10 and 11. However, since there is a substantial spacing between them, the oscillator is not loaded to a very great degree, though it may be 50% or 75% of full load, depending upon the position selected for the limit switch 46.

In order to increase the power or energy supplied to the load 12, the spacing of the electrodes 10 and 11 is decreased. This is accomplished as a function of the potential difference which exists across the resistor 17, which it will be remembered is included in the anode supply circuit. The potential difference or IR drop across the resistor 17 is applied by conductors 62 and 63 to a sensitive device shown in the form of a contact-making galvanometer 64. The galvanometer 64 has a pointer or contact-making member 65 operable between contacts 66 and 67. As already explained, in starting up the oscillator, the spacing between the electrodes 10 and 11 is a maximum, and the anode current is small. Therefore, the sensitive device 64 will not be energized sufficiently to have moved the contact member 65 away from the contact 66. Accordingly, a relay 68 will be de-energized for completion of a circuit for the operating coil of a contactor 69 which controls the energization of the motor 49 for rotation in a direction to lower the electrode 10.

While the sensitive device 64 might, from a theoretical standpoint, be utilized directly to controy relays for the operation of the contactors 42 and 69, from a practical standpoint the operation would very likely be erratic. This arises from the fact that positive operation is desired in response to relatively small changes in value of the anode current, for example, operation is desired in response to a change in the anode current of the order of 2% of the full load current thereof.

Further in accordance with the invention, positive operation of the contactors 42 and 69 is secured with elimination of erratic operation which, in the absence of the invention, might arise due to erratic contact resistance between the contact member 65 and the contacts 66 and 67. More specifically, a pair of electric valves 70 and 71 are provided for positive control of the relay 68 and a relay 72 provided to control the energization of the contactor 42. The valves 70 and 71 have their anode circuits connected to the secondary winding of a transformer 73 supplied from a suitable source of alternating current, as for example from the conductors 31 and 32. The anode circuit for the valve 70 may be traced from one side of the secondary winding of transformer 73 by way of the operating coil of relay 72, the anode and cathode of valve 70, the resistor 74 and by conductor 75 to the other side of said secondary winding. Similarly, the the operating coil of the relay 68 is included in the anode circuit of the valve 71, and a resistor 76 is included in circuit with the cathode-return circuit thereof. The operating coils of relays 68 and 72 are by-passed or shunted by capacitors 77 and 78. These capacitors function to maintain the relays in their energized positions, notwithstanding the fact that half-wave unidirectional energizing current is supplied thereto by the valves 70 and 71. The resistors 79 and 80 are respectively connected between the grids and cathodes of the respective valves 70 and 71, while the resistors 81 and 82 are respectively connected in series in the grid circuits thereof.

With the contact member 65 in circuit-making engagement with the contact 66, it will be observed that the grid of the valve 71 is connected by way of the resistor 82, contact 66, contact member 65, and by a resistor 76 to the cathode. Thus, there will be applied to the grid a negative bias having a magnitude determined by the current through the valve and by the resistance of the cathode resistor 76. The resistors 79 and 80 have relatively high resistances—each may be of the order of 2 megohms, while the resistors 81 and 82 may each be of the order of 200,000 ohms, with the respective cathode resistors 74 and 76 of the order of 2000 ohms. These circuit constants have been found satisfactory for electric valves or tubes of the 6J5 type. The negative bias applied to the grid of valve 71 greatly decreases the current flowing through it; hence, the relay 68 remains in its illustrated de-energized position.

On the contrary, the grid of the valve 70 is effectively at cathode potential because of the connection thereto through the resistor 79. The result is that a substantial current flows through the valve 70 to energize the relay 72 which opens its contacts.

It will be recalled that the relay 45 was energized by the movement of the slide to close the slide-actuated switch 36. When this occurred, an energizing circuit was completed from the supply line 31 by way of the contacts of relay 68, contacts 60 of relay 45, the operating coil of contactor 69, contacts 83 of the lower limit switch and to the other supply line 32. The contactor 69 closes to energize the motor to lower the electrode 10. The motor, through suitable speed reduction gearing, then operates to lower the electrode 10 at a relatively slow rate. As soon as the electrode 10 begins to move, the voltage applied to the dielectric material 12 rises and the output of the oscillator rises. As soon as the output corresponds with the normal full-load rating thereof, the potential difference across the resistor 17 rises an amount sufficient to energize the sensitive device 64 for movement of its contact member 65 midway of contacts 66 and 67. As soon as the circuit is broken through the contact 66, the negative bias theretofore applied to the valve 71 disappears and the grid thereof is effectively connected by resistor 80 to the cathode. In consequence, the relay 68 is immediately operated to its energized position. The opening of its contacts, of course, de-energizes the contactor 69 to stop the motor 49.

The system has now functioned automatically to bring the oscillator up to full load, or to any selected predetermined load. The selection of the desired load may be readily made by relative adjustment between the resistor 17 and the contact 17a.

As long as the electrical characteristics of the dielectric material 12 remain constant, the oscillator will have a substantially constant output. It is characteristic of some dielectric materials that the electrical properties thereof will vary with temperature. Thus, if the dielectric material 12 is a preform of a phenolic molding compound, the power factor will increase as the temperature thereof rises. In consequence, the oscillator would deliver a greater power output to the material 12. The increased output is reflected by a rise in the anode current. The increased potential difference, however, energizes the sensitive device 64 for operation of the contact member 65 to complete a circuit through the contact 67. Through this circuit, which includes resistor 81, there is applied to the grid of valve 70, the negative bias from the cathode resistance 74 abruptly to decrease the current through the valve. Accordingly, the relay 72 is de-energized to complete a circuit for the operating coil of the contactor 42. This circuit may be traced from the supply line 31 by way of conductors 43 and 84, contacts of relay 72, conductor 85, operating coil of the relay 42, and by way of the limit switch 46 to the other supply line 32. The motor 49 is thereby energized in a direction to raise electrode 10. It is raised until the anode current of the valve means 13 returns to its normal or predetermined value, at which point the sensitive device 64 operates to interrupt the grid-biasing circuit to the valve 70, thereby to energize the relay 72 and to de-energize the motor 49.

Should the power factor of the dielectric material 12 decrease, or should the load decrease, it will be understood that the decreased voltage drop across the resistor 17 will cause the sensitive device 64 to complete a circuit by way of the contact 66 for de-energization of the relay 68.

In consequence, the motor 49 will be energized to lower the electrode 10 until full load has been again established on the oscillator including electric valve 13.

The foregoing operations are entirely automatic. They are carried out in an efficient and reliable manner. The system will correctly function under a wide variety of conditions to maintain a predetermined, or the maximum permissible, power loading of the oscillator and will insure maximum efficiency of operation of the valve means 13.

Now that the principles of the invention have been explained, it will be understood that the invention may be applied to oscillators of widely differing types.

The control system may be utilized to vary the position of the tap 23a which completes the connection from the conductor 23 to the inductor 22. Thus, by raising or lowering the tap 23a, the voltage applied between the electrodes 10 and 11 may be increased or decreased. However, the adjustment of the spacing of the electrodes is the preferred method.

In heating preforms, and in many other applications of the invention, it is frequently desired to terminate the heating or treating cycle after a predetermined time interval. This may be conveniently done by including the time-delay relay 38 in the energizing circuit of the coil of relay 35. The operating coil of the relay 38 was energized by operation of the slide-actuated switch 36. The circuit may be traced from supply line 31 by way of switch 36, conductors 55 and 87, operating coil of the timing relay 38, conductor 88, and by contacts 40 of relay 35 to the other supply line 32. The timing relay 38 may be preset for any given time of operation. For example, after a heating interval of 15 seconds, this relay may operate to open its contacts to de-energize the relay 35. This relay in turn de-energizes the relay 45 which thereupon operates to close its contacts 44 to complete the energizing circuit for the motor-controlling contactor 42. In consequence, the motor 49 is energized to raise the electrode 10 to its uppermost position, preparatory to the insertion of additional plastic material between the electrodes 10 and 11 for heating thereof. As soon as the next charge of material has been placed on the slide and moved between the electrodes, the switch 36 is operated from its illustrated position to initiate a new cycle of operations.

Referring to Fig. 2, there has been illustrated by the broken lines 89 a housing which may include the system as a whole and all of the circuit elements thereof. The housing may be provided with a drawer or slide 90 on which may rest a preform or other dielectric material 12, which is to be heated. It is to be observed that when this slide or drawer 90 is moved inwardly the end thereof engages one end of an arm of the switch 36 to move the contacts from one circuit-closing position to the other. It may be further observed that the adjustable electrode 10 is mounted by one or more insulators 91 to an arm 92 carried to parallel links 93 and 94 respectively pivoted at 95 and 96 from a frame 97. The parallel links 93 and 94 maintain the electrode 10 parallel to the cooperating electrode 11 for a relatively wide range of spacing therebetween. The link 94 carries a guide 98 for a cam 99 driven by the motor 49, shown only in Fig. 1. It will be observed that rotation of the cam 99 in one direction or the other will raise or lower the electrode 10.

Instead of utilizing valves of the type generally known to those skilled in the art as vacuum tubes, there may be used tubes of the type sold under the trade name "Thyratrons." Referring to Fig. 3, a pair of grid-controlled arc rectifiers or "Thyratrons" 100 and 101 of the tetrode type have been illustrated with their respective output circuits connected to include the operating coils of the relays 72 and 68. It will be observed, corresponding parts have been labelled with like reference characters. In some cases, letter subscripts have been added. Thus, the transformer 73a, energized from a suitable source of alternating current, has one secondary winding connected in the output circuits of the two "Thyratron" valves 100 and 101. This transformer has an additional secondary winding 73b connected in the input circuit to the valves; i. e., the winding 73b is connected to the cathodes thereof and to the juncture of a pair of resistors 102 and 103, the opposite ends of which are connected to the control grids of the "Thyratron" valves 100 and 101. The winding 73b applies to the respective control grids, a voltage having an instantaneous polarity which is negative with respect to the instantaneous positive polarity of voltage applied to the anode or output circuits. In consequence, the "Thyratron" valves 100 and 101 are normally biased to maintain them non-conductive. The resistors 102 and 103 have relatively high resistance values, of the order of one megohm, as compared with the resistance (of the order of one-tenth megohm) of resistors 104 and 105 connected in circuit with the control grids and the respective contacts 67 and 66 of the galvanometer 64. When the galvanometer coil 64 is energized to move its contact member 65 into engagement with the contact 67, it will be observed that the control grid of the valve 100 is connected through the resistor 104 and the contact member 65 to ground. Since the cathodes are also connected to ground, the result is to decrease the voltage applied by the transformer winding 73b to the grid. The bias voltage will be but a tenth of its former value and far below that necessary to maintain the "Thyratron" valve 100 in its non-conductive condition. Thus, the "Thyratron" valve 100 immediately "fires" or becomes conductive for passage of a substantially large current therethrough. This energizes the relay 72 to close the contacts 72a for energization, by way of the conductor 84, of the contactor 45, shown only in Fig. 1. At the same time, the relay 72 will open its contacts 72b connected in series with the operating coil of relay 68.

As soon as the power input to the load has been decreased, as already explained, the galvanometer 64 moves its contact member 65 out of engagement with the contact 67, again to apply the higher value of negative bias potential to the control grid. The valve 100 is rendered non-conductive to de-energize the relay 72 which, of course, moves to its illustrated de-energized position.

In case of diminution of power input to the load 12, the galvanometer 64 completes a circuit through the contact 66 to reduce the negative bias on the control grid of valve 101. In like manner, the operating coil of relay 68 is energized to close the contacts 68a for energization of the motor-controlling contactor 69. As soon as the power output of the oscillator has been increased to the desired value, the relay 68 is de-energized by the opening of the circuit through the contact 66.

The galvanometer 64 is a relatively sensitive detector and operates from one contact-making position to the other upon a change of power of the order of 2%; i. e., if normal current for the oscillator is 99 milliamperes, the galvanometer will complete one circuit connection when the output current is 98 milliamperes, and it will complete the other circuit connection when the output current is 100 milliamperes. The actual current flowing through it may only change from 1.96 milliamperes to 2 milliamperes. For currents of such a low order, it will be apparent that there may be considerable variation in the contact resistance of the galvanometer contacts, but that variation will have no effect upon the operation. The operation is such that as soon as the contact member 65 touches either of contacts 66 or 67, one or the other of the "Thyratron" valves 100 or 101 fires to produce positive and instantaneous energization of the corresponding relay.

Now that the principles of my invention have been fully explained, it will be understood that electric valves of any suitable type may be employed and that further modifications may be made in the invention without departing from the true spirit and scope of the invention as set forth in the claims. Thus, while the system in Fig. 1 operates to energize the relays upon opening of the galvanometer contacts, the system of Fig. 3 operates to energize the relays upon closure of those contacts. Either arrangement may be utilized, or in Fig. 1, the relays may be connected for opening and closing of the circuit which includes the resistors 79 and 80, and instead of a motor 49, other driving means such as a hydraulic cylinder or air-engine may be utilized.

What is claimed is:

1. The combination with an electrical oscillator for generating high-frequency electrical energy, electrodes for applying said energy to a dielectric load, said oscillator including valve means, a combined output tank circuit where the capacitance of the dielectric load between said electrodes forms the capacity of the tank circuit, and a grid circuit energized from said tank circuit, of a motor for adjusting the position of one of said electrodes with respect to the other electrode, switching means for said motor for controlling the direction of adjustment of said one electrode relative to the other electrode, electric valves for controlling said switching means, a contact-making galvanometer responsive to change in the load on said oscillator for selectively controlling the conductivity of said electric valves and thereby controlling the operation of said switching means for producing operation of said motor in a direction to change the spacing and capacitance between said electrodes in a direction and to an extent to maintain at predetermined rate the high-frequency energy input to said load, relay means for completing a circuit for operation of said motor to separate one electrode from the other independently of operation of said sensitive means, a limit switch for bringing said electrode to standstill with said electrodes separated a predetermined distance one from the other, and means operable upon insertion of said dielectric load between said electrodes for energizing said relay means to open said last-named circuit to restore control of said motor to said electric valves and switching means associated therewith.

2. The combination with an electrical oscillator for generating high-frequency electrical energy, electrodes for applying said energy to a dielectric load, said oscillator including valve means, a source of anode supply, an output tank circuit where the capacitance of the dielectric load between said electrodes is included therein as the capacity of the tank circuit, and a grid circuit energized from said tank circuit, of a motor for adjusting the position of one of said electrodes with respect to the other electrode, switching means for said motor for controlling the direction of adjustment of said one electrode relative to the other electrode, electric valves for controlling said switching means, a contact-making galvanometer responsive to the load on said source of anode supply for selectively controlling the conductivity of said electric valves and thereby controlling the operation of said switching means for producing operation of said motor in a direction to change the spacing and capacitance between said electrodes in a direction and to an extent to maintain at predetermined rate the high-frequency energy input to said load, relay means controlling the connection of said anode supply to said valve means and initially completing a circuit for operation of said motor to separate one electrode from the other independently of operation of said sensitive means, a limit switch for bringing said electrode to standstill with said electrodes separated a predetermined distance one from the other, and means operable upon insertion of said dielectric load between said electrodes for energizing said relay means to open said last-named circuit to restore control of said motor to said electric valves and for completing the connection of said source of anode supply to said valve means.

3. A high-frequency dielectric heating system comprising a self-excited electric oscillator for generating high-frequency electrical energy, said oscillator including valve means having a power supply input circuit and a frequency-determining output tank circuit including a pair of electrodes disposed in spaced heating relation to a dielectric load and forming the capacitance of said tank circuit, said load during heating imposiing an inherently varying load demand upon said oscillator, structure for supporting one of said electrodes for movement relative to the other of said electrodes for varying the capacitance of said tank circuit by change of spacing between said electrodes to control the voltage applied to the dielectric load, reversible driving means for said structure, direction-controlling means for controlling said driving means for selective movement of said structure in one direction or the other to change the spacing and capacitance between said electrodes during heating of said dielectric load, said oscillator having a grid circuit energized from said tank circuit, an impedance connected in series with said power supply input circuit for developing a voltage which varies with change in said load demand imposed upon said oscillator, and means including a sensitive device connected in circuit with said impedance means for selectively controlling said direction-controlling means for moving one electrode toward and away from the other electrode to so vary the high-frequency voltage applied to said load as to maintain substantially constant the flow of current in said power supply input circuit for delivery to said dielectric load of electrical energy at a substantially constant predetermined value notwithstanding changes in the electrical characteristics of the load which produce said inherently varying load demand.

WILFRID L. ATWOOD.

REFERENCES CITED

The following references are of record in the file of this patent:

UNITED STATES PATENTS

| Number | Name | Date |
|---|---|---|
| 1,542,850 | Curtis et al. | June 23, 1925 |
| 1,800,303 | Lindsay | Apr. 14, 1931 |
| 1,801,657 | Buyko | Apr. 21, 1931 |
| 1,911,656 | Van Benschoten | May 30, 1933 |
| 1,971,313 | Johnson | Aug. 21, 1934 |
| 2,105,598 | Hubbard | Jan. 18, 1938 |
| 2,109,776 | Johnson | Mar. 1, 1938 |
| 2,209,883 | Gohorel | July 30, 1940 |
| 2,251,277 | Hart et al. | Aug. 5, 1941 |
| 2,324,525 | Mittelmann | July 20, 1943 |
| 2,335,335 | Zenner | Nov. 30, 1943 |
| 2,366,500 | Eastin | Jan. 2, 1945 |
| 2,369,678 | McWhirter | Feb. 20, 1945 |
| 2,382,435 | Mann et al. | Aug. 14, 1945 |
| 2,396,004 | Gilbert | Mar. 5, 1946 |
| 2,415,799 | Reifel et al. | Feb. 11, 1947 |
| 2,416,172 | Gregory et al. | Feb. 18, 1947 |
| 2,467,285 | Young et al. | Apr. 12, 1949 |

FOREIGN PATENTS

| Number | Country | Date |
|---|---|---|
| 439,166 | Great Britain | Dec. 2, 1935 |
| 556,292 | Great Britain | Sept. 28, 1943 |

OTHER REFERENCES

Mittelmann, "Load Rematching in Electronic Heating," Electronics, February 1945, pages 110–115, pages 114 and 115 relied on.